J. ZENTMAYER.
Combination of Lenses for Photographic Purposes.

No. 55,195. Patented May 29, 1866.

Witnesses
Coleman Sellers
Cornelia Sellers

Inventor
Joseph Zentmayer

United States Patent Office.

JOSEPH ZENTMAYER, OF PHILADELPHIA, PENNSYLVANIA.

COMBINATION OF LENSES FOR PHOTOGRAPHIC PURPOSES.

Specification forming part of Letters Patent No. 55,195, dated May 29, 1866.

*To all whom it may concern:*

Be it known that I, JOSEPH ZENTMAYER, of the city and county of Philadelphia, in the State of Pennsylvania, have invented an Improvement in the Combination of Lenses for Photographic Purposes; and I hereby declare the following to be a full and exact description thereof.

The object of my invention is to produce an instrument more simple in construction than has heretofore been made, capable of including a wide angle of vision, and giving an image free from all marginal curvature, the same instrument being applicable to the taking of either large or small pictures, with but little additional cost over a lens with which to make pictures of any one given size, or, in other words, with one mounting producing combinations of different focal lengths.

The nature of my invention consists in arranging a doublet of meniscus lenses of different curvatures but with their exterior surfaces concentric, the lens with the longest radius being used as the front lens of the combination; then in using the front lens of such a combination as the back lens in combination with one of still longer focus or radius to form an instrument of larger size or longer focus.

To enable one skilled in the art to make instruments on my improved plan, I will proceed to describe my invention, referring to the accompanying drawings, making part of this specification, in which—

Figure 3:
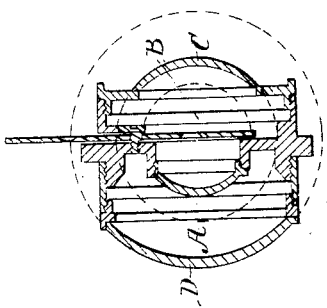
Figure 2:
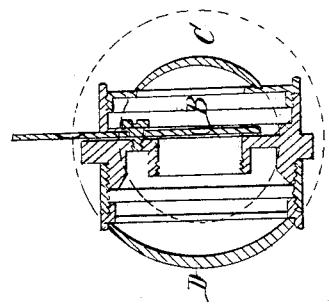
Figure 1:
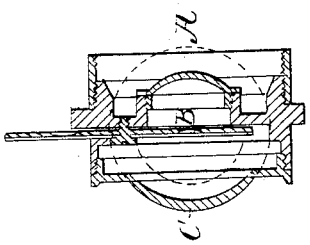

Figure 1 shows, in section, a combination of short focus. Fig. 2 shows, in section, a combination of longer focus. Fig. 3 shows, in section, the three lenses used in Figs. 1 and 2 in one mounting as ready for transportation, similar letters on each referring to similar parts.

To originate any system of combinations I take, in the case of a short focus, Fig. 1, a meniscus lens, A, of four-tenths inch exterior radius and of five-tenths inch interior radius. The outside of this lens I place at its exterior radial distance from the center of the stop-plate B—*i. e.*, at four-tenths of an inch—and I make it the back lens of the doublet. Then as a front lens, C, I make a meniscus, whose curves bear the same proportions to each other as the curves of lens A—as, for instance, six-tenths inch outside radius and three-fourths inch inside radius. The exterior surface of this lens I place six-tenths of an inch from the same stop-plate B. Their exterior surfaces, considered each as a portion of a sphere, will be of different radii, but concentric.

To make a combination of longer focus and yet use one of the lenses of Fig. 1, I make use of the lens C as the back lens in Fig. 2, and in combination with it use a lens, D, of the proportion four to six larger in exterior curvature—*i. e.*, of nine-tenths inch and whose inner curve is one and one-eighth inch. This will give a doublet of about double the focus of the one shown at Fig. 1.

The three lenses may be held in one mounting, as shown in Fig. 3, for convenience of carriage, and when either focal length is required, the use of either D or A in combination with C will produce the arrangement shown at Figs. 1 or 2.

All these lenses must be made of the same kind of glass, provided the exterior and interior curves of each be proportional. Of course different glass could be used in each if the proportion of the interior curves be arranged in relation to the dispersive and refractive power of the glasses.

Assuming a set of three lenses, as shown above, to be the base of a series of combinations of various focal lengths, of which Fig. 1 is the shortest focus of the series, then using the front of one combination as the back of the next in series in any fixed ratio, I can produce a succession of combinations or doublets of any required focal length, the stop-plate B rotating in its mounting as a common center for all and having its openings made in a proportional series of areas. That lenses thus combined, made of the same kind of glass, must be corrected achromatically, or nearly so, is evident when we consider that only a nearly radial ray can pass through the center stop, B, and this ray must be at the same time nearly radial to the second lens, and therefore nearly achromate, for there it meets a prism equal but opposite to that through which it has passed. This in relation to the central rays as well as the marginal ones.

The lenses must of necessity be thin. This insures but little glass to obstruct those delicate chemical rays used in forming the photographic image, which rays, it is well known, meet with opposition in proportion to the thickness of the glass passed through. Lenses thus arranged possess in the first place the merit of great simplicity, each lens of each doublet being a simple uncorrected meniscus.

Three or more lenses can be combined in one mounting. If three are thus combined they can be used for two focal lengths; if four are so combined, for four focal lengths, and this with no more lenses than are really used in a doublet of two connected lenses capable of making but one size of image. The nature of the exterior spherical curves insures freedom from marginal curvatures.

Having thus described my invention in reference to its object, nature, and mode of construction, I do not limit my claim to the precise curves and arrangement as given; but

What I claim as new, and desire to secure by Letters Patent, is—

1. A doublet made of uncorrected meniscus lenses of different spherical curvatures, arranged concentrically, or nearly so, substantially in the manner and for the purpose specified.

2. The arrangement of a series of uncorrected meniscus lenses of different spherical exterior, any two of which series, when set concentrically, form a corrected, or nearly corrected, doublet, substantially in the manner as specified.

JOSEPH ZENTMAYER.

Witnesses:
   COLEMAN SELLERS,
   CORNELIA SELLERS.